United States Patent [19]

Stevenson

[11] Patent Number: 4,519,972
[45] Date of Patent: May 28, 1985

[54] METHOD FOR USE OF PATTERN TRANSFERS IN ROTOMOLDING

[76] Inventor: Michael J. Stevenson, 1312 Say Rd., Santa Paula, Calif. 93060

[21] Appl. No.: 495,754

[22] Filed: May 18, 1983

[51] Int. Cl.³ ............................................. B29C 5/04
[52] U.S. Cl. ................................... 264/245; 249/103; 249/104; 264/310
[58] Field of Search ...................... 264/245, 310, 255; 249/103, 104

[56] References Cited

U.S. PATENT DOCUMENTS

| | | | |
|---|---|---|---|
| 2,601,700 | 7/1952 | Pinsky et al. | 249/104 |
| 3,550,197 | 12/1970 | Szajna et al. | 249/104 |
| 4,213,926 | 7/1980 | Toyoda | 264/245 |
| 4,252,762 | 2/1981 | Stevenson | 264/245 |
| 4,318,683 | 3/1982 | Fisbaugh | 264/310 |

FOREIGN PATENT DOCUMENTS 52-5867  1/1977  Japan ................................. 264/310

Primary Examiner—James Derrington
Attorney, Agent, or Firm—Robert E. Strauss

[57] ABSTRACT

There is disclosed a method for imparting a decorative or printed pattern to the surface of rotationally molded products during their manufacture. In this method, the decorative patterns are formed on a sheet film transfer as a coating of pigments dispersed in a hydrocarbon wax which overlays a release agent, such as a silicone coating on the sheet film. The decorative wax pattern is applied to a preselected area of an inside wall of the rotational molding cavity by positioning the transfer against the surface of the wall and burnishing the pattern onto the interior wall of the mold cavity. Thereafter, the particulate molding resin is charged to the cavity and the product is molded in a conventional procedure, resulting in transfer of the pattern as pigments incorporated into the resin, with most of the wax surfacing and being excluded from the product.

6 Claims, 6 Drawing Figures

METHOD FOR USE OF PATTERN TRANSFERS IN ROTOMOLDING

BACKGROUND OF THE INVENTION

1. Field of Invention

This invention relates to a method for imparting decorative and printed matter onto molded products and, in particular, onto rotationally molded products.

2. Brief Statement of the Prior Art

In rotational molding, products are formed within a mold cavity by charging molding resin particles to the cavity, closing the cavity, preheating the cavity to a molding temperature and rotating or tumbling the mold, usually in two or more axes for a sufficient time to disperse the resin particles into a molten polymer film which coats the interior walls of the cavity with a coating of uniform thickness. Thereafter the mold is cooled, opened and the rotationally molded product is discharged.

An inherent disadvantage of this molding technique is that decorative or printed matter cannot readily be applied to the molded product. This disability is aggrevated by use of conventional molding resins e.g., polyolefins, such as low, medium or high density and linear polyethylene or polypropylene; ethylene-vinyl acetate copolymers, etc., which form surfaces that are not readily receptive to coatings of paints, inks and the like.

Some attempts have been made to chemically or physically treat the surfaces of rotomolded products, e.g., by flame treatment, to render the surfaces receptive to printing inks. These procedures are costly and do not result in a molded product in which the pigments or dyes of the decorative pattern or printing are incorporated into the molded skin of the product, and even the best coatings can be worn or rubbed off.

In my recent U.S. Pat. No. 4,252,762, I disclosed and claimed a method for treating the surfaces of the mold cavity by applying a decorative or printed pattern thereto using a suspension of pigments in a hydrocarbon oil. While this method incorporate decorative and printed patterns in the surfaces of rotomolded products at a high resolution, some difficulties are experienced with the process, particularly when a decorative pattern is to be applied to a surface having a complex or compound curvature, since silk screens and other stencils must be applied to essentially flat surfaces. Also stenciling is a difficult operation requiring a high degree of skill, particularly for multiple color patterns.

BRIEF DESCRIPTION OF THE INVENTION

This invention comprises a method for decorating or imprinting preselected areas of rotomolded products. The method is practiced by applying, to at least one preselected area of the interior wall of the rotomolding mold cavity, a decorative pattern or printed matter using an intermediate transfer. The transfer which is used comprises a sheet film carrier, preferably paper, which has been coated with a release agent, preferably a silicone. The decorative pattern or printed matter is applied to the film sheet carrier, overlying the coating of release agent. This decorative coating comprises a dispersion of pigments in a petroleum wax together with various other optional ingredients to enhance its transfer properties.

The transfer pattern is burnished onto the preselected area of the mold cavity, and the particulate molding resin is charged to the mold cavity, the cavity is closed and is heated and tumbled as in a conventional rotomolding process.

The petroleum wax melts during the rotomolding and flows over the surface of the mold, outwardly from the transfer application area, depositing the pigments in precisely the pattern in which the pigmented wax pattern was applied to the inside wall of the mold cavity. During the molding process, the molding resin melts and fuses into a film of even thickness which, when cooled, forms the rotomolded product. The pigments which remain in the decorative or printed matter pattern are embedded into the wall of the molded product. The wax apparently surfaces and the majority of the wax diffuses outwardly from the pattern area leaving a printed pattern on the product having a surface substantially identical to the untreated areas of the product.

BRIEF DESCRIPTION OF THE DRAWINGS

The invention will be described in the figures of which.

DETAILED DESCRIPTION OF THE INVENTION

Figure 1:
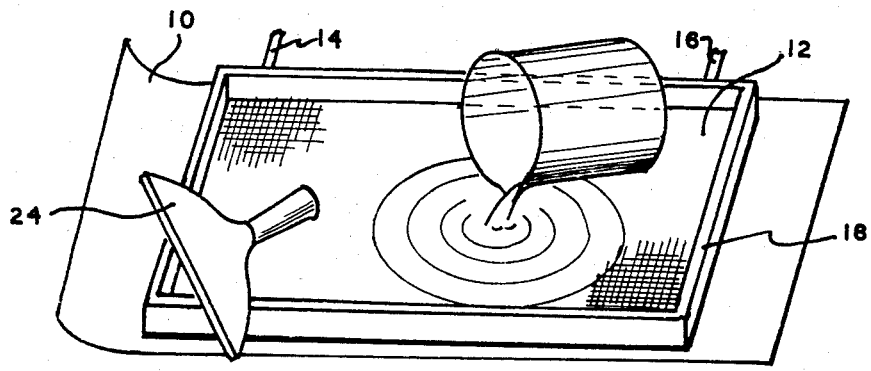
FIG. 1 illustrates preparation of the transfer of the invention.

The invention uses decorative or printed matter transfers in a rotomolding process. FIG. 1 illustrates preparation of the transfers in which a film sheet carrier 10 is imprinted with the decorative or printed matter. Various sheet films can be used for this purpose such as plastic films, e.g., polyethylene, polypropylene, polyvinyl acetate, cellulose acetate, etc., having a thickness from about 2 to about 10 mils. Preferably, paper is used because of its dimensional stability, flexibility and availability. Most preferably, rough surfaced paper (rather than smoothly calendered paper) is used for stability of the resulting transfer. For this purpose parchment paper, or other sheet films of similar surface texture, is used. The film carrier is preferably coated with a release agent which, preferably, is a silicone oil that is applied to at least one surface thereof to facilitate the subsequent transfer of the imprinted pattern.

The decorative or printed matter is applied to the surface of the sheet film 10 preferably using a stencil or stencils for this purpose. Since the pattern is applied by two successive transfers, first onto an interior wall of the mold and, thereafter, to the rotomolded product, the pattern is applied to the sheet film as a direct or positive image, appearing on sheet film 10 exactly as it is to appear on the product. The preferred technique is to employ a silk screening method in which one or a plurality of silk screens 12 are used. The particular screens used are preheated to maintain the pigmented carrier used in the process in a molten condition. For this purpose the silk screens can be provided with means for electrically heating the screens such as electrode bars 14 and 16 which are connected to a suitable source of electrical power such as low voltage AC or DC current. The screens are formed of wire, preferably stainless steel wire, to provide a conductivity between electrode bars 14 and 16 to permit their electrical heating. For this purpose, the screens are isolated electrically from the box or frame 18 of the silk screen by a suitable electrically insulating gasket or insulator. The screens employed are of a suitable fineness to achieve a desirably high resolution in the finished transfer. Typically, screens of 100 to 600 mesh, preferably, from about 200 to about 450 mesh are used.

The molten wax containing the pigment for the particular color of the silk screen is applied or poured onto the silk screen as shown in FIG. 1 and the molten wax and pigment mixture is dragged across the surface of the silk screen with a squeege 24 or similar tool. The silk screen 12 is then removed and, if desired for multicolor applications, one or more or successive screen applications are employed, by positioning the successive screens in substantially identically the same position as the previously employed screen and repeating the steps of adding a preselected pigmented carrier and applying the carrier through the silk screen onto the transfer 10 using the squeege or similar tool 24.

The pigments which are employed should be non-bleeding such as inorganic finely subdivided solids or organic colorants encapsulated in thermosetting resins. The inorganic pigments include oxides and salts of metals such as titanium, iron, lead, zinc, cadmium, mercury, chromium, molybdium, etc. Titanium dioxide in both anatase and rutile crystal form is the predominantly used white pigment. Iron oxides are used for black, red, brown and tan colors; lead chromate is used for yellow, lead molybdates for orange, red, and related colors, and mixtures can be prepared for varied shades of orange. Lead chromate is also combined with iron blue, ferric-ferroyanide, to prepare green colors. The cadmium salts and oxides are used for red, maroon and yellow shades and other salts include the aluminates such as cobalt aluminate or titanates such as chromium titanate.

Organic pigments which can be used in the invention are the conventional organic pigments employed in molding resins, including azo compounds which have one or two azo linkages to provide orange, yellow and red compounds which include napthol or toluidine groups. Some of the azo pigments include chelate metals, e.g., chelated nickel yellow. Another class of organic pigments are the phthalocyanine greens and blues. Colors of red, maroon, and violet can be obtained with the quinacridone pigments. The isindolinones are a group of pigments in the red to yellow color range. The anthraquinones such as anthraquinone red, indathrone blue, and anthrapyrimidine yellows are also suitable for use in the invention.

The organic colorants are used in a pigment form, typically finely subdivided solid solutions of organic salts and/or dyes in transparent resins. Typical resins which are used for preparation of the solid solutions include melamineformaldehyde or triazine-formaldehyde resins which have a brittle glass-like property and which can be finely ground to a powder of proper size, typically with average particle diameters of from 2 to about 10 microns.

Carbon black is widely used as a pigment for a black coloration and typically carbon blacks are effective at relatively low concentrations and are available in a very finely subdivided state for use in the invention.

Special color effects can also be imparted in the liquid colorants. These special effects include the metallics in which finely subdivided metal powders such as aluminum and aluminum alloys are used to produce brilliant blue-white highlights and copper and copper alloys with zinc are used to produce gold and bronze highlights. These can be admixed with the inorganic pigments to impart a metallic luster to the molded products. Pearlescent effects can be also achieved using lead carbonate or other commercially available pearlescent colorants in combination with other pigments.

The pigments are employed in a finely subdivided state, typically having particle diameters from 0.05 to about 25 microns, preferably from 0.5 to about 15 microns. Carbon blacks are usually in the most subdivided state, typically with particle diameters from about 0.05 to about 10 microns and the inorganic pigments including the metallics are usually in the size range with average particle diameters from 1 to about 10 microns. The pigments are employed as a solid concentration from 5 to about 85 weight percent. The actual concentration varies somewhat with the color intensity and identity of the particular pigment; generally the range is from 45 to about 75 weight percent solids for the inorganic and from 9 to about 15 weight percent, preferably from about 10 to 12 weight percent for carbon black.

The carrier which is used for the pigment is a hydrocarbon wax, preferably a light-colored to transparent-white wax. Examples of these are: microcrystalline wax, plastic wax, paraffin wax and synthetic wax, and mixtures thereof. A suitable wax is a microcrystalline wax having a melting point from 140 to 225 degrees F. and molecular weights from 350 to 420. The microcrystalline waxes are refined petroleum waxes crystallized from solvents used to extract wax from highly paraffinic petroleum stocks.

Plastic waxes, which are less refined and contain branched chain and naphthenic hydrocarbons, which reduces their hardness and crystallinity, can also be used. The plastic waxes usually having melting points from about 140 to 182 degrees F.

Paraffin wax, which is an industry designation of a wax can also be used. This wax has a very crystalline structure and consists chiefly of n-paraffin hydrocarbons having from 16 to 38 carbons and minor quantities, less than twenty percent of branched chain paraffins, less than 15 percent monocyclic paraffins, and less than 5 percent polycyclo paraffins. Its melting point is from 110 to about 160 degrees F.

Synthetic hydrocarbon waxes such as those derived from polymerization of hydrocarbon olefins such as ethylene propylene, and copolymers thereof can also be used. These include polyethylenes having molecular weights from 450 to about 2500 and, typically, with a narrow molecular weight distribution. These are available with melting points from 180 to 260 degrees F., and copolymers with propylenes having melting points from 130 to 165 degrees F.

The wax which is used should have a melting point of at least 135 degress F., and waxes of higher melting point are preferred, since they provide increased protection against oblation of the pattern of pigments during the preheating portion of the mold cycle. The color of the wax is important when the pattern includes light colored pigments, e.g., white and pastel colors. Preferably waxes which are amber to white, and most preferably, white, are used.

Various additives can be added to the wax to improve its properties, such as polyisobutylene to increase the viscosity of the wax, and rosin (terpene) and its derivatives to increase the tack of the wax. Normally these additives are used at concentrations from 2 to about 25 weight percent, preferably from 5 to about 15 percent. At very high pigment loadings, over 50 weight percent, petrolatum can be added in an amount up to about 25 weight percent to maintain ductibility of the pigmented wax.

The pigments are suspended in the selected wax carrier or wax mixture by melting the wax or mixture of waxes, blending in any optional additives and then stirring the molten wax while adding the powdered pigment. Preferably, the mixture is subjected to high shear using a colloid mill, or other equipment capable of applying a high shearing action to the mixture.

Figure 2:
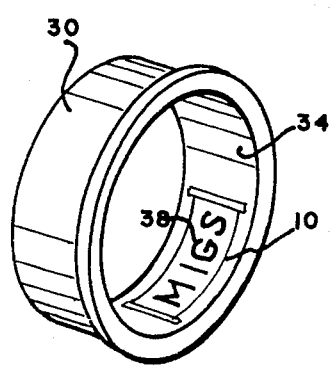
FIG. 2 illustrates application of the transfer to an inside wall of a rotomold cavity.

Referring now to FIG. 2, the use of the transfer will be described. As there illustrated, a portion or half 30 of a rotomold cavity is treated with the transfer 10 of the invention. This transfer has, printed on its undersurface, a pattern 32 of indicia or printed matter and the printed side of the transfer is applied against a clean mold surface. Preferably, the application is made while the mold surface is relatively cool, typically at a temperature less than about 150 degrees F., preferably less than about 100 degrees F. If necessary, however, high melting point waxes can be used in the formulation of the wax in the transfer to permit application to hot mold surfaces. The transfer is positioned against preselected area 34 of the interior side wall of the mold cavity 30 and is temporarily secured thereto by suitable means such as pressure sensitive tape 36 and the like. It is important that the transfer be secured to avoid movement during the subsequent transfer step.

Figure 3:
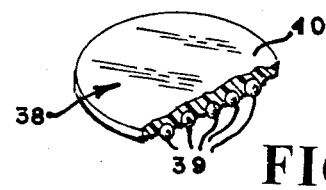
FIG. 3 is a sectional perspective view of a suitable burnishing tool.

The pattern is transfered onto the interior wall area 34 of mold cavity 30 using a transfer tool such as a burnishing pad 38. The burnishing pad is moved lightly across the transfer surface and, during its application, a visible change in color of the pattern 32 will be observed, indicating to the applicator that the pattern has been transferred to the mold cavity surface 34. FIG. 3 illustrates a preferred burnishing pad. This pad comprises a plurality of metal balls 39 which are embedded in a plastic mat 40 at a depth sufficient to retain the balls while permitting the balls to project out of the mat slightly. The mat is formed of a suitably flexible plastic such as polyethylene, or a plastisol such as a polyvinyl chloride plastisol, or rubber such as a synthetic styrene butadiene rubber, etc.

Once the pattern has been applied to the interior surface 34 of the mold cavity 30, the transfer paper is removed and the mold cavity is ready for the remaining rotomolding steps.

Figure 4:
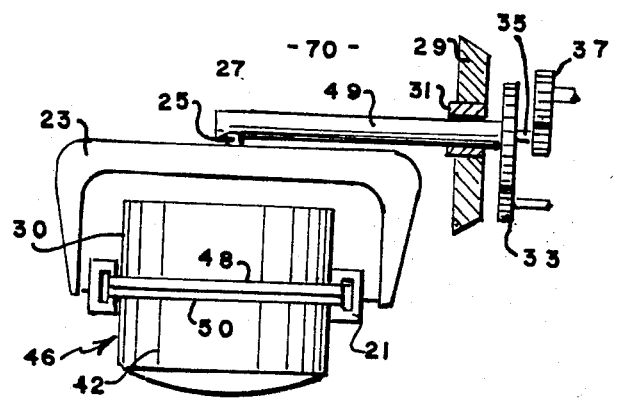
FIG. 4 illustrates charging of the molding resin to the mold cavity.

In the rotomolding operation, the granular or powdered molding resin is charged to the mold cavity, the mold cavity is closed, and is mounted in a rotational mechanism within the cavity of a furnace. This operation is illustrated in FIG. 4, where the mold 46 is shown in its assembled condition with cavity portions 30 and 42 joined at their respective flanges 48 and 50 by a suitable means such as a plurality of clamps 21. The assembled mold cavity is mounted in a suitable mechanism such as the yoke 23 which is pivotally mounted on shaft 25. The latter is dependent on support shaft 27 which extends through a suitable packing gland 31 in the wall 29 of the furnace or oven cavity. The support shaft 27 is a concentric assembly of outer shaft 49 which is driven in rotation by gear 33, and the concentric inner shaft 35 which is rotated by drive gear 37, externally mounted to the furnace chamber generally indicated at 70.

The oven conditions within chamber 70 are maintained at rotomolding conditions preselected for the particular molding resin employed. Typically a complete rotomolding cycle may be from 5 minutes to several hours, with the preheat portion of the cycle being from about 30 seconds to about 15 minutes, although in some instances preheat cycles may be up to 30 minutes such as with convection ovens when close control of wall thicknesses is desired. The oven cavity 70 is heated sufficiently to heat the wall surfaces of the mold 46 to an elevated temperature, usually from about 250 to about 550 degrees F. The mold is rotated along at least two axes such as 41 and 43 at a rotational speed of from about 10 to about 30 revolutions per minute and this rotation of the mold is conducted for a period of from 3 minutes to several hours or more after the mold reaches the necessary molding temperature, depending on the size and wall thickness of the final product.

Figure 5:
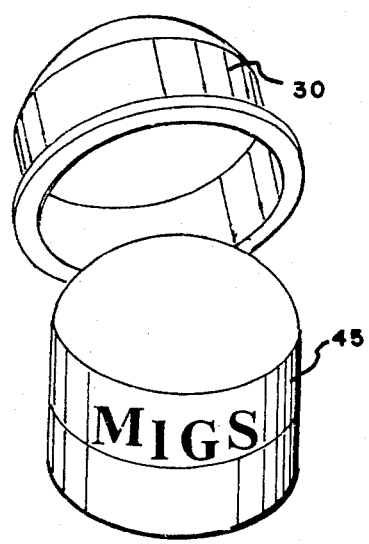
FIG. 5 illustrates the rotomolding process.

After sufficient time has been provided to completely melt the granular resin and distribute the molten resin as a liquid film of uniform thickness across the entire interior surfaces of the mold, the mold cavity is cooled while continuing to rotate the cavity until the liquid film on its interior surfaces gels and begins to solidify. This generally occurs with most molding resins at a temperature from about 229 to 325 degrees F. The mold is cooled sufficiently to permit the discharge and subsequent handling of the molded product. As illustrated in FIG. 5, the mold cavity is removed from the rotational mechanism and opened and the molded product 45 is discharged from the mold cavity 30.

It will be observed that the finished product will have, embedded in its wall, the pattern of pigments in precisely the same pattern 32 as was printed onto the transfer 10 in the transfer printing step. This transfer is of sufficient resolution in the product that detailed printed matter can be applied to the molded product 45 in accordance with the invention.

Once the product 45 is discharged from the mold cavity 30, the latter is ready for reuse by reapplication of another transfer, repeating the steps shown in FIGS. 2 and 4. No cleaing of the surfaces of cavity 30 is necessary as the wax carrier used in the transfer is removed from the surface of the mold and is incorporated into the finished molded product 45. Nevertheless, the surface of the molded product 47 is not impaired or diminished in quality of strength or appearance by this printing process. Microscopic examination of the wall of the molded product 45 reveals that the pigmented particles are embedded within the wall of the molded product. The wax carrier used with the pigment in effecting the transfer has disappeared entirely, blending into the walls of the molded container.

Figure 6:
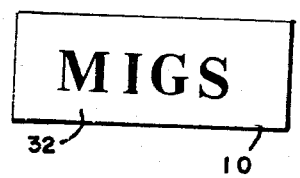
FIG. 6 illustrates the transfer used in the invention.

Referring now to FIG. 6, the transfer pattern is there illustrated with the imprinted matter "MIGS" in a positive pattern, i.e., as it is intended to appear on the finished molded product; see pattern 32 appearing on the molded product 45 of FIG. 5. This contrasts with most transfers which are prepared as negative images, i.e., reversed side to side, from the image as it is to appear on the finished product.

The invention has been described with reference to the presently preferred and illustrated embodiments. It is not intended that the invention be unduly limited by this disclosure of the presently preferred and illustrated embodiments. Instead, it is intended that the invention be defined by the means, steps and materials, and their obvious equivalents set forth in the following claims.

What is claimed is:

1. The method of decorating products formed by a rotational molding process which comprises;
    (a) preparing a decorative pattern transfer by coating a sheet film carrier with a silicon release agent, and overcoating said release agent coating with a pattern coating comprising a mixture of from 5 to 85 weight percent of pigments dispersed in a hydrocarbon wax having a melting point from about 150 to about 280 degrees F. and distributed on said film carrier in a predetermined pattern;
    (b) positioning said decorative pattern transfer against a preselected area of an inside wall of a rotation mold;
    (c) burnishing said decorative pattern coating onto said inside wall of said rotational mold, and removing said sheet film carrier;
    (d) charging said mold with particulate molding resin; heating said mold and conducting the rotational molding of the product with heating to coalesce the particulate molding resin; and
    (e) recovering from the mold a product having a decorative or printed surface on a preselected area of its exterior surface.

2. The method of claim 1 wherein said film carrier is rough surfaced paper.

3. The method of claim 1 wherein said wax is a petroleum wax.

4. The method of claim 3 wherein said petroleum wax is a microcrystalline wax having a melting point from 140 degrees to about 225 degrees.

5. The method of claim 1 wherein said pattern coating comprises a mixture of from 45 to about 75 weight percent of an inorganic pigment dispersed in said wax.

6. The method of claim 1 wherein said particulate molding resin is a polyolefin.

* * * * *